United States Patent [19]

Foote et al.

[11] 3,874,586

[45] Apr. 1, 1975

[54] INFORMATION-CARRYING ARTICLE AND READING APPARATUS AND METHOD

[75] Inventors: Francis C. Foote, Rocky River; Robert L. Carper, Eastlake, both of Ohio

[73] Assignee: Addressograph-Multigraph Corporation, Cleveland, Ohio

[22] Filed: Dec. 18, 1972

[21] Appl. No.: 316,319

[52] U.S. Cl.235/61.11 D, 235/61.12 M, 346/74 M, 360/135

[51] Int. Cl...... G06k 7/08, G11b 5/82, G06k 19/06

[58] Field of Search235/61.12 M, 61.11 D, 61.12 N; 346/74 MP, 74 M; 340/149 A, 146.3 AE; 250/219 DC; 360/135, 136; 200/46

[56] References Cited

UNITED STATES PATENTS

| | | | |
|---|---|---|---|
| 3,075,194 | 1/1963 | Gray | 346/74 MP |
| 3,100,834 | 8/1963 | Demer | 346/74 MP |
| 3,189,732 | 6/1965 | Russell | 346/74 MP |
| 3,461,305 | 8/1969 | Moulton | 250/219 DC |
| 3,471,862 | 10/1969 | Barney | 346/74 MP |
| 3,629,834 | 12/1971 | Randall | 340/149 A |
| 3,676,644 | 7/1972 | Vacaro | 235/61.11 D |
| 3,772,081 | 11/1973 | Franer | 360/135 |
| 3,795,009 | 2/1974 | Gaynor | 346/74 M |

*Primary Examiner*—Daryl W. Cook
*Assistant Examiner*—Robert M. Kilgore
*Attorney, Agent, or Firm*—Harry M. Fleck, Jr.

[57] ABSTRACT

A machine readable card has information carried thereon by offset portions defined therein, as by embossing. The information is read or decoded by sensing at least one longitudinal strip area of the card extending through the information area and having a plurality of portions which are alternately encoded with opposite polarity fields, such as magnetic or electric, with the field portions being disrupted by the offset portions in accordance with the information. The decoding is further facilitated by a clock track extending along a noninformation strip area of the card and having an uninterrupted plurality of alternate polarity field portions which are scanned and compared with the portions in the strip area which extends through the information area.

8 Claims, 4 Drawing Figures

INFORMATION-CARRYING ARTICLE AND READING APPARATUS AND METHOD

BACKGROUND OF THE INVENTION

The present invention relates to the art of machine readable characters or codes and, more particularly, to a plastic card or other information-carrying member which is machine readable and to a method and apparatus for reading the information-carrying member. The type of information members to which the present invention is especially directed is the type in which the information is read by sensing a field, e.g., magnetic or electric, established by material on the information member or by sensing the effect of the material on a field path, such as the effect of ferromagnetic material on the reluctance of a path to magnetic flux.

This type of information member will be referred to herein as a field effect type. It has the information defined by material for establishing a field effect in accordance with the information to be read, and is to be distinguished from information members which are read optically or by mechanically feeling the information on the card, e.g., by sensing punched holes mechanically.

One approach employed in the prior art is similar to that of magnetic tape recorders in which a signal that is recorded on a magnetic tape is modulated in accordance with the pattern to be recorded, before the signal is recorded on the tape. The tape accepts, retains, and redelivers the signal with a recording sensitivity that is uniform for all segments of the tape. The signal to be recorded, and not the shape of the information-carrying tape, is modulated so as to contain the information.

In another approach in the prior art, magnetic particles, e.g., magnetic inks, have been used to render characters and codes machine-readable in response to magnetic readers. Conventionally, the material has been rendered magnetic and either the magnetic field has been sensed or the effect of the character or code element on the reluctance of a magnetic flux path has been measured to read the character or code.

One problem in using field effect materials as the medium to be sensed is that of assuring a sharp line of demarcation between the character or code element and the background material. Conventionally, the magnetic information element is applied to a flat surface and the printing technique for applying the information elements must be precise to assure that proper lines of demarcation are maintained. When the information element is subjected to abrasion, as it is when used on credit cards, the magnetic material tends to smear and render the line of demarcation indefinite.

SUMMARY OF THE INVENTION

In accordance with the present invention, the information member together with magnetic material carried thereon are modified, as by embossing, so that raised areas on one side provide visually detectable information and indented areas on the opposite side on which the magnetic material is located may be sensed to read the information.

Another aspect of the invention includes a method of reading the information carried by an information-carrying member wherein the information is defined by portions offset from adjacent portions. A field effect reader is moved along a path corresponding with a strip area extending through the offset portions to sense a plurality of field effect portions which are alternately encoded with opposite polarity fields. The reader provides a train of output signals of alternately opposite sense with the signals being interrupted in dependence upon the offset portions in the strip area. These output signals are then processed to provide an indication as to the information carried by the member.

Yet another aspect of the present invention is to provide information storage systems that are unusually reliable because of high signal to noise ratio resulting from displacement of material of an information-carrying member, and because of high signal strengths resulting from magnetic saturation and from a flux reversal method of measurement, and because of permanency, because of relative insensitivity to great variations in environmental conditions, and because it includes a clock track to facilitate data decoding.

Further aspects and advantages of the present invention will be apparent from the following detailed description of the specific forms of the preferred embodiment thereof made with reference to the accompanying drawings.

IN THE DRAWINGS

Figure 3:
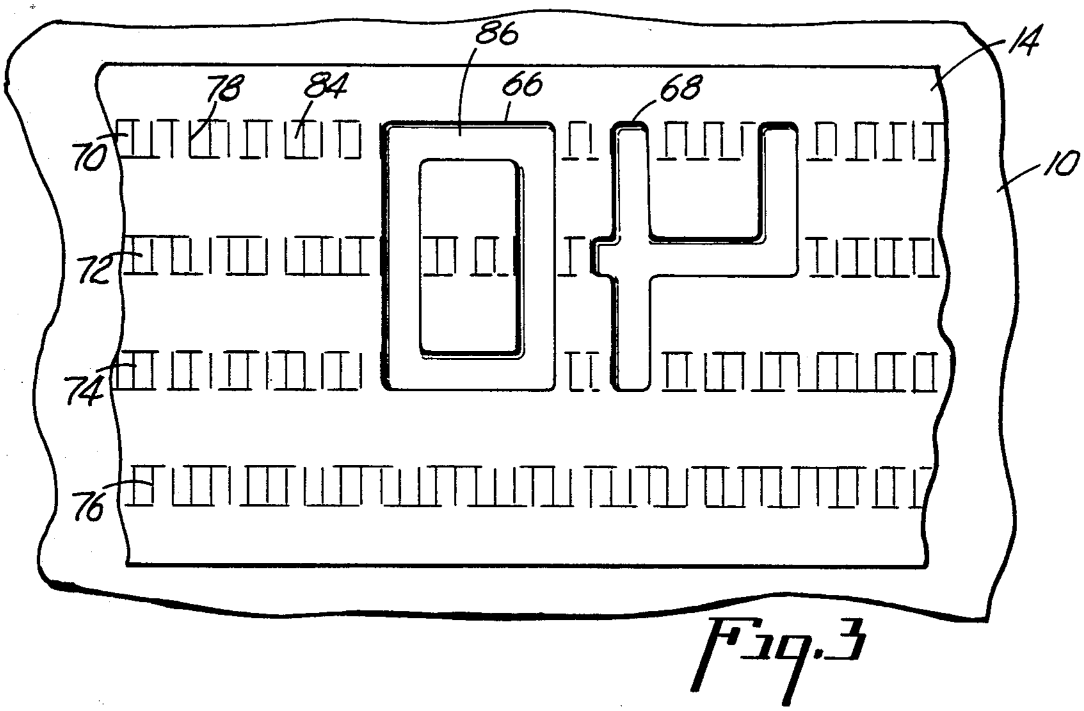
Figure 4:
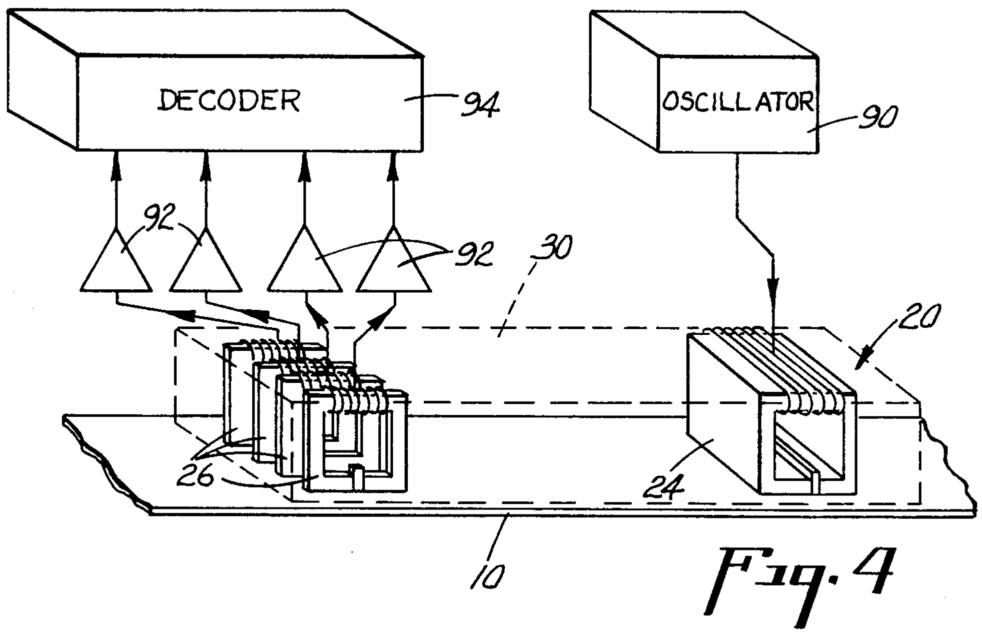

FIG. 3 is an enlarged back view showing a segment of the magnetic strip and a few of the embossed characters and four tracks on which the recording head writes magnetic signals and from which the reading head reads magnetic signals; and FIG. 4 is an isometric view of a four track credit card showing one recording head, four reading heads, and electronic equipment associated with the recording reading and decoding processes.

DESCRIPTION OF THE PREFERRED EMBODIMENT

Figure 1:
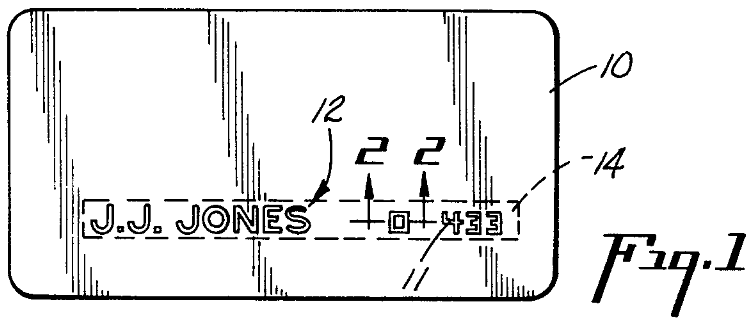
FIG. 1 is a plan view illustrating a plastic credit card with a strip of magnetic material on its back and embossed characters on its face embossed through the strip.

In a preferred embodiment, the information member, shown in FIG. 1, is a plastic credit card 10. Information to be read is embossed on the card to offset portions 11 from the plane of the card to form the information elements, e.g., characters in the form of letters and numbers which comprise a legend 12 for identification, such as the customer and account number. The information-carrying portion of the card preferably has a strip of magnetic material 14 on the side of it which is to be machine read. The strip 14 of magnetic material is continuous and preferably is applied before embossing the information on the card, by any of various common methods such as hot foil transfer, wet coating, lamination, etc. Therefore, the embossing also displaces a part 15 of the magnetic strip with the displacement of the card. In the illustrated embodiment, the magnetic material is on the side of the card to which the male embossing die is applied. The information characters are therefore indented or intaglioed, as seen from the side of the card on which the strip 14 is present.

After the magnetic strip has been embossed, the displaced magnetic materials will have a different field effect on a reading head against the back side of the card than will the non-displaced portions which are essentially in the plane of the back side. This difference in field effect is utilized to read the card.

In the preferred embodiment, the magnetic materials of which the strip is made may be any of a variety of known materials, such as a square loop material like nickel iron having high coercive force, or iron oxides, or electro-deposited cobalt nickel plating. The iron oxides may typically be a synthetic red iron oxide, such as cobalt substituted $Fe_2O_3$ or gamma $Fe_2O_3$, or a black oxide of iron, such as $Fe_3O_4$. Chromium dioxide $CrO_2$ may be used where it is desired to have a low Curie point. Preferably, the magnetic material is of a type which retains its magnetization after a magnetizing force has been removed, that is, it has high remanent induction.

The card is machine read by first magnetizing the magnetic material so as to provide narrow side-by-side zones of alternated magnetic polarity on it. Portions of the magnetic material that were not displaced from the main surface by embossing are effectively magnetized; portions that were displaced and not effectively magnetized because of their greater distance from the magnetizing head, to be described below. Information is then read as the card is scanned by a reading head which produces an electrical pulse for each reversal of magnetic flux on the magnetic material, according to details in the description which follows.

Figure 2:
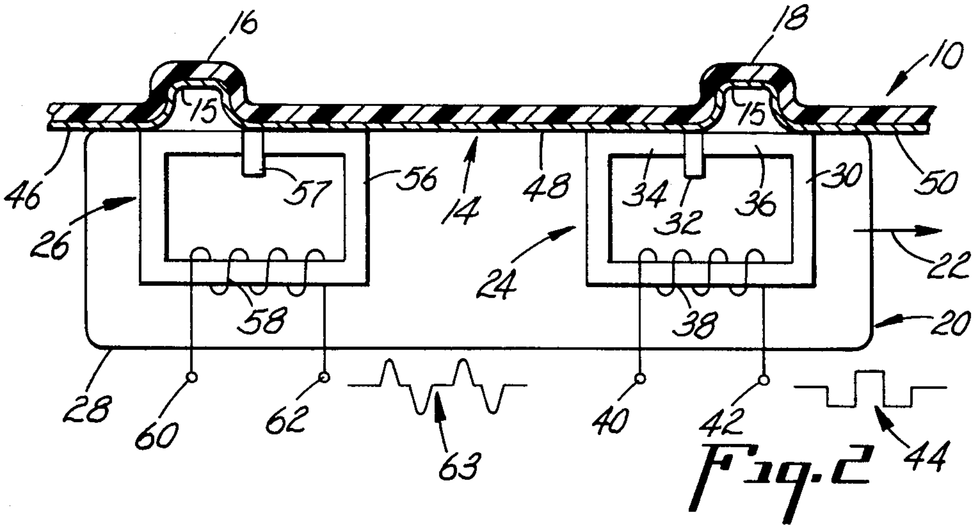
FIG. 2 is an enlarged view in cross section of the card taken generally along line 2—2 of FIG. 1 looking in the direction of the arrows and also showing a magnetic recording head and a magnetic reading head for recording and reading signals on the magnetic strip.

An enlarged cross-sectional view of a portion of the credit card on which a magnetic strip has been mounted is shown in FIG. 2. The card 10 has bosses 16 and 18 which are parts of the legend 12 of characters embossed on the card. The thickness of the magnetic strip 14 is somewhat exaggerated in FIG. 2 for clarity. For reading the information, a readwrite assembly 20 traverses the card, which is stationary, in a longitudinal direction 22. Assembly 20 includes a magnetic recording head 24 and a magnetic reading head 26 suitably mounted to a block of nonmagnetic material 28.

Recording head 24 has a magnetic core 30 which is almost a closed loop, with pole pieces 34 and 36 defining a small gap 32. Gap 32 is filled by a shim of low permeability material which controls the spacing between the pole pieces 34 and 36 of the magnetic core. Core 30 is made of a highly permeable magnetic material having a high saturation flux density level and low remanence. A coil of wire 38 having terminals 40 and 42 is wound on the core 30 of the recording head.

To record magnetic signals, e.g., spatially alternating zones of different magnetic polarization, on the magnetic material 14, a square wave of alternating current 44 is applied to the terminals 40 and 42 as the assembly 20 moves along the strip. When the current flows between terminals 40, 42, a longitudinal magnetomotive force is applied to the magnetic strip 14 near the gap 32 because the magnetic material 14 acts as a shunt for the low permeability gap 32. Magnetic induction is produced in the magnetic strip 14 in a longitudinal direction (parallel to direction 22) throughout the width of the poles pieces 34 and 36. In this way, magnetic fields of alternating polarity are produced in the magnetic strip by the square wave alternating current as the assembly 20 moves along the strip 14, the magnetomotive force being in excess of the coercive force of the magnetic strip material and each portion of the strip remains magnetized after the assembly has moved on. The current in coil 38 is strong enough to create a saturation level of flux density throughout the full depth of the magnetic strip 14 for portions of the strip which are close to the pole pieces 34 and 36.

In the preferred embodiment, the recording and reading heads have small residual induction because of the material of which they are made. Moreover, they are so shaped and of such permeability that they do not saturate magnetically before the magnetic strip itself saturates if the strip is close by.

The square wave 44 of current impressed on the coil 38 in this way causes alternating transverse strips of longitudinally oriented magnetic field zones to be created in all portions of the magnetic strip 14 which are close enough to the scanning path of the pole pieces 34 and 36 to be magnetized. Portions 15 are not close enough. The close portions are typified by regions 46, 48 and 50 of FIG. 2.

Portions 15 of the magnetic strip 14 are on the displaced portions of the card. On those portions the magnetic strip is sufficiently far from the pole pieces 34 and 36 that even when the pole pieces are directly overhead, they do not create enough field intensity to significantly magnetize the portions 15. The additional path length for the lines of flux from coil 38 is such that the magnetic field at each portion 15 is much less than that required for magnetizing the magnetic strip 14, so negligible magnetization occurs in embossed regions 15.

Each reading head 26 has a core 56 with a gap 57 between its pole pieces. The reading head core 56 is wound with a conductive coil 58 having terminals 60 and 62. In the case of a reading head, the coil is used as a pick-up coil in which voltages are induced as flux changes occur in core 56, the voltage thus induced appearing at terminals 60, 62. The direction of the flux reverses in the core 56 as the gap 57 passes over zones of alternating magnetic polarity on the magnetic strip 14. FIG. 2 shows the induced voltage 63 that is read as a function of time by reading head 26. Positive-going changes in magnetic field induction or flux density in the reading head, and negative-going flux reversals create voltage pulses of like polarity.

Voltage is induced in coil 58 only when the gap 57 of the reading head is close to the magnetic strip 14 and not when, because of embossing, it is offset. Even if significant alternating magnetic zones had been recorded on the embossed portion 15 of the magnetic strip, any signal from the offset portions would be very small relative to the signals from the non-offset portions.

In the preferred embodiment, four reading tracks 70, 72, 74 and 76 are used, by way of example, for each line of characters, as shown in FIG. 3. A single recording head spans all four of the tracks. Characters 66, 68 that have been embossed in the card 10 are intercepted by three of the four tracks 70, 72, 74, 76 which are the loci of possible positions of four reading heads. Tracks 70, 72 74 intercept the characters; the fourth track 76 serves only as a clock track for producing synchronizing signals that aid in interpreting data read from the first three tracks.

When moving over the information, the recording head 24 produces spatially alternating zones of magnetization across the width of the magnetic strip, but only tracks where the reading heads travel are significant. The direction of magnetization within each zone is longitudinal, that is, perpendicular to the boundary lines 78 of alternating zones. On portions such as 84 of the tracks where there is no embossing, the recording and reading are efficiently accomplished, and strong signals are read that indicate the absence of embossing at those areas. In areas such as 86 where the card has been offset by embossing to define a character, the recording head cannot efficiently record signals and the reading head cannot efficiently read them, even if they had been recorded, so that no signals are detected.

When reading the characters, as assembly 20 passes over the card, a time sequence of voltage signals appears simultaneously at terminals 60, 62 of each of the four reading heads described previously. The signals that are read from the upper, middle and lower tracks 70, 72 and 74 which intercept the characters provide sufficient information to identify the character, when analyzed as functions of time or of the position of the reading head. Clock track 76 aids in decoding the signals from the three tracks which intercept the characters by enabling the identification of the reading head location as by counting flux reversals.

If any magnetic records remain on the card from previous passages of the recording head, they are obliterated by a new passage of the head. It writes over whatever record previously existed because it records at saturation flux levels in both polarities.

The above described system is more fully illustrated in FIG. 4. In FIG. 4, a square wave current oscillator 90 excites recording head 24. The recording head spans the entire strip, and the four reading heads are side-by-side separated by magnetic shields, not shown. The output voltages of the reading heads are amplified by preamplifiers 92 and applied to a signal processing the data decoder 94.

Minor details of the decoding circuits are omitted because they are old in the data processing art. Briefly, one way of performing the decoding functions of decoder 94 is to place the four signals which it receives from preamplifiers 92, after processing, into four shift registers, and to examine the contents of those registers simultaneously. Decoding circuits in decoder 94 correlate their patterns with the changing patterns of data in the shift registers by static logic. When characters occur which the decoding circuits have been programmed to identify, they recognize them and produce output signals which specify the characters.

In other magnetic embodiments of the invention the decoder 94 which interprets the recovered signals may be responsive to the amplitude of the received voltage signal, to its slope, or to change in the slope of the wave form as a maximum or minimum point is passed.

In other embodiments, the embossing, reliefing, or intaglioing can be done in various ways suggestive of positive and negative logic systems. For example, if the side from which the characters are readable directly by eye is denominated the front of the card, the following are examples of combinations:

a. Characters raised on the front; magnetic strip located on the front.
b. Characters indented as seen from the front of the card; magnetic strip located on the front.
c. Characters indented as seen on the back; magnetic strip located on the back.
d. Characters raised on the back; magnetic strip located on the back.

In all configurations, the magnetic heads are preferably on the same side as the magnetic strip of contact recording and reading are to be performed. They can be on either side for noncontact recording if the card is made thin enough.

It will also be appreciated that the clock track may be one in which bosses are employed on the clock track also to show character positions.

The magnetic embodiments are not limited to longitudinal magnetization in which the magnetic induction is parallel to the direction of relative motion between the heads and the magnetic material as described for the preferred embodiment. The direction of magnetization could instead be transverse or vertical. By transverse is meant in this case that the magnetic induction is at right angles to the direction of travel of the heads with respect to the magnetic materials, but lies in the plane of the magnetic strip. Vertical magnetization refers here to magnetization in which the magnetic field vector is perpendicular to the principal plane of the magnetic strip.

One of the important advantages of the presently preferred magnetic embodiment is that a high signal level is available because of the saturation mode of recording that is employed. In sub-areas which are close to the recording and reading heads, the magnetic material is driven to complete saturation, the flux reversals are between domains of positive saturation and of negative saturation.

A second important advantage, is that if the magnetic strip has high coercivity, this serves as a noise filter and as a threshold for the recording of flux reversals on the magnetic material.

Another advantage of the preferred embodiment is that saturation level magnetization of the magnetic materials obviates the necessity for an erasing head, because it permits a jam transfer or a writing-over of the old test signal by each new test signal.

Another advantage of all magnetic embodiments of the invention is that magnetic materials do not deteriorate. They tolerate considerable physical abuse and they are relatively insensitive to wide variations of environmental conditions. Not only is the magnetic material itself very durable, but magnetic signals recorded on it are also relatively durable and withstand considerable abuse.

Either, separate heads can be employed for recording and reading, mounted in such a way that the recording head passes over the magnetic material before the reading head passes over it, or successive passes with a single head for each track may be made for recording and reading.

While it is envisioned in the preferred embodiment that the card will be magnetized immediately before the card is read and each time that the card is read, such remagnetizing may not be necessary for some other applications of the invention, because of the magnetic material's great tolerance to abuse and repeated readings.

The embossed card of the type shown in FIG. 1 may also be used in a susceptance-type of reading system. In such a system, the permeance of the magnetic reading circuit would be modulated essentially by the displacement of sub-areas of the credit card. In this embodiment, presence or absence of magnetic material at various places on the card is read by interrogating the surface with a magnetic susceptance-measuring head which has a gap in its magnetic core near the surface being interrogated. A head of this type can use either a permanent magnet as a source of magnetomotive force or an electromagnet to produce the necessary magnetomotive force. Where a permanent magnet is used, sudden changes in flux in the measuring head are detected as the head passes over the card. Where an electromagnet is used, it can be excited by either a DC or an AC current. Where a DC current is employed, sudden changes in permeance of the magnetic path due to changes from near presence to far presence, or vice versa, of magnetic materials under the scanning head are detected. Where an AC current is used, the permeance of the magnetic path under the head may be continuously measured even without any motion of the reading head over the card, by measuring the impedance of the reading head or else by reading the amount of voltage induced in a second coil wound on the same magnetic core (in the reading head) as the excitation coil. The output indicates variations of magnetic flux in the core as controlled by the permeance of the magnetic path in the neighborhood of the magnetic gap of the core, which is shunted magnetically by magnetic material on the credit card. A susceptance-reading system of this type preferably employs magnetic materials of low retentivity so that when the magnetomotive force applied to them is removed, the magnetic induction within them falls to a negligible value.

Whereas the preferred embodiment has been described with respect to a read-write assembly including a read head and a write head mounted on a common block, these heads may be separated. For example, the write function may be accomplished with a write head which is driven by a speed control mechanism exhibiting excellent uniformity of speed for recording the flux reversals. The read head may be driven by a separate drive. This would allow economy of mechanical construction since high speed fluctuations in reading would have little affect on the decoding, which depends on the clock track. The flux reversals may be recorded separately from the reading function by various methods. For example, a prerecorded magnetic tape may be laminated to the card prior to embossing. Also, the magnetic strip could be recorded as a part of manufacture of an unembossed card. The flux reversals may be applied to the magnetic strip just prior to or possibly just subsequent to embossing by an auxiliary to the embossing mechanism. Other modifications in applying the flux reversals are contemplated.

A still further modification would offer the advantages of writing with the read-write mechanism while allowing the read-write mechanism to perform a reading function with a low degree of speed regulation. This may be accomplished by providing a prerecorded, dimensionally stable strip mounted within the read-write assembly. This strip is then scanned with a third head as the read-write heads of the reader pass across the card. In effect, the clock track has been removed from the card and made a permanent part of the read-write mechanism. The flux reversals recorded on the card would be triggered by the sensed reversals on the reference strip within the read-write assembly, thus assuring uniform spacing independent of the speed of the read-write assembly. Reading would take place as in the previously described methods except that it may be convenient to record on the forward pass and to read on the return pass. This could shorten the swept path, eliminate one head and possibly effect other simplifications.

Another modification of the reader head is a field measuring head such as those employing a Hall effect element in the back gap. This would present a square wave output at terminals 60 and 62 as opposed to the differentiated output signals shown in the drawings. The use of such a Hall effect element would permit extremely low speed scanning since the signal arises from the flux induced in the head's core by bringing fields from the recorded signals on the magnetic medium, rather than a rate of change thereof.

The broader aspects of the present invention are applicable to an information member which is entirely magnetic and has the characters embossed to provide offset, i.e., displaced areas, which will have a different field effect.

What is claimed is:

1. A method of reading an information carrying member having an information area on one side thereof with raised characters being defined by first portions offset from adjacent portions comprising: scanning the member with a first field effect reader with relative movement therebetween along a first path corresponding with a first strip area having a plurality of field effect portions encoded to provide a train of output signals of alternately opposite sense with the output signals being disrupted in accordance with the said offset portions in said first strip area, scanning with a second reader a second path simultaneously with scanning of said first path by said first reader, said second path corresponding with a second strip area extending through an area of said member remote from said raised characters, said second strip area also having a plurality of field effect portions which are encoded with fields and defining a clock track on said member to provide a train of clock pulse signals of alternately opposite sense, and utilizing said clock pulse signals to identify the position of the said first reader along the first path, said clock pulse signals along with said output signals utilized for identifying the raised characters on said member.

2. A method as set forth in claim 1 wherein each of said strip areas includes a layer of magnetic material on said member with said field effect portions being magnetized to provide magnetic fields of alternately opposite polarity.

3. A character recognition apparatus for reading from a magnetizable member alpha-numeric characters defined by offset portions raised from a planar surface of the member on one side thereof, said apparatus comprising:

first magnetic field effect reader means for scanning the member on said one side along a first path coincident with the offset portions to provide first signals indicative of the presence of the planar surface of the member and second signals representative of the presence of an offset portion of the member;

second magnetic field effect reader means for scanning the member on said one side along a second path spaced from the offset portions to provide clock pulse signals indicative of the position of said first reader means along said first path;

means for effecting relative movement between said first and second reader means and the member for scanning thereof; and circuit means for processing said first and second signals from said first reader means together with said clock pulse signals to provide output signals representative of the character data defined by the offset portion.

4. The apparatus set forth in claim 3 including means magnetically encoding the member prior to reading by said first reader means, said encoding producing predetermined magnetic field patterns along said path whereby said first signals from said first reader means are of corresponding predetermined patterns and are disrupted by the offset portions to provide said second signals.

5. The apparatus set forth in claim 4 wherein said encoding means creates a series of alternately opposite polarity magnetic fields in the magnetizable member along said first path.

6. The apparatus set forth in claim 3 including a plurality of said first reader means for scanning a corresponding plurality of parallel paths on the member, said first and second signals from each of said first reader means being processed by said circuit means to provide output signals representative of the alpha-numeric characters on the member.

7. The apparatus set forth in claim 6 including means for magnetically encoding the member prior to reading by said plurality of first reader means, said encoding producing predetermined magnetic field patterns along each of said parallel paths whereby said first signals from each of said first reader means are of corresponding predetermined patterns and are disrupted by the offset portions to provide said second signals.

8. The apparatus set forth in claim 7 wherein said encoding means creates a series of alternately opposite plurality magnetic fields in the magnetizable member along each of said parallel paths.

* * * * *